(12) United States Patent
Shirabe

(10) Patent No.: US 12,259,024 B2
(45) Date of Patent: Mar. 25, 2025

(54) EXTENSION-RETRACTION DEVICE

(71) Applicant: TOYOTA JIDOSHA KABUSHIKI KAISHA, Toyota (JP)

(72) Inventor: Takeo Shirabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/501,428

(22) Filed: Nov. 3, 2023

(65) Prior Publication Data

US 2024/0240699 A1     Jul. 18, 2024

(30) Foreign Application Priority Data

Jan. 18, 2023    (JP) ................................ 2023-005846

(51) Int. Cl.
     *F16H 19/06*      (2006.01)
(52) U.S. Cl.
     CPC ................................ *F16H 19/0618* (2013.01)
(58) Field of Classification Search
     CPC ............. F16H 19/0618; F16H 19/0663; F16H 19/0654; F16H 19/064; F16H 19/0645; F16H 2019/0667; B25J 18/02; B25J 18/04

See application file for complete search history.

(56) References Cited

U.S. PATENT DOCUMENTS

| | | | |
|---|---|---|---|
| 2006/0005651 A1* | 1/2006 | Laforest | B66F 11/00 74/425 |
| 2021/0194388 A1* | 6/2021 | Iwamoto | H02N 2/025 |
| 2021/0214203 A1* | 7/2021 | Erickson | B66F 11/00 |
| 2021/0341041 A1* | 11/2021 | Iwamoto | F16H 19/0618 |

FOREIGN PATENT DOCUMENTS

JP      4607772 B2     1/2011

* cited by examiner

*Primary Examiner* — Charles A Fox
*Assistant Examiner* — Gregory T Prather
(74) *Attorney, Agent, or Firm* — SoraIP, Inc.

(57) ABSTRACT

A telescopic device includes a telescopic tubular structure and an inner guide member. The outer belt and the inner belt of the tubular structure are provided with a plurality of protrusions and holes provided in two rows in the longitudinal direction. The inner guide member has a first helical groove and a second helical groove extending along a plurality of projections respectively provided in one row on the tip side and the base side of the tubular structure. The first straight line connects the end of the fitting portion where the first spiral groove and a part of the plurality of projections of the inner belt are fitted and the center axis of the cylindrical structure. A second straight line connects the terminal end of the second spiral groove and the central axis. The angle between the second straight line and the first straight line is less than 180 degrees.

1 Claim, 18 Drawing Sheets

II-II

IIIC-IIIC

VC-VC

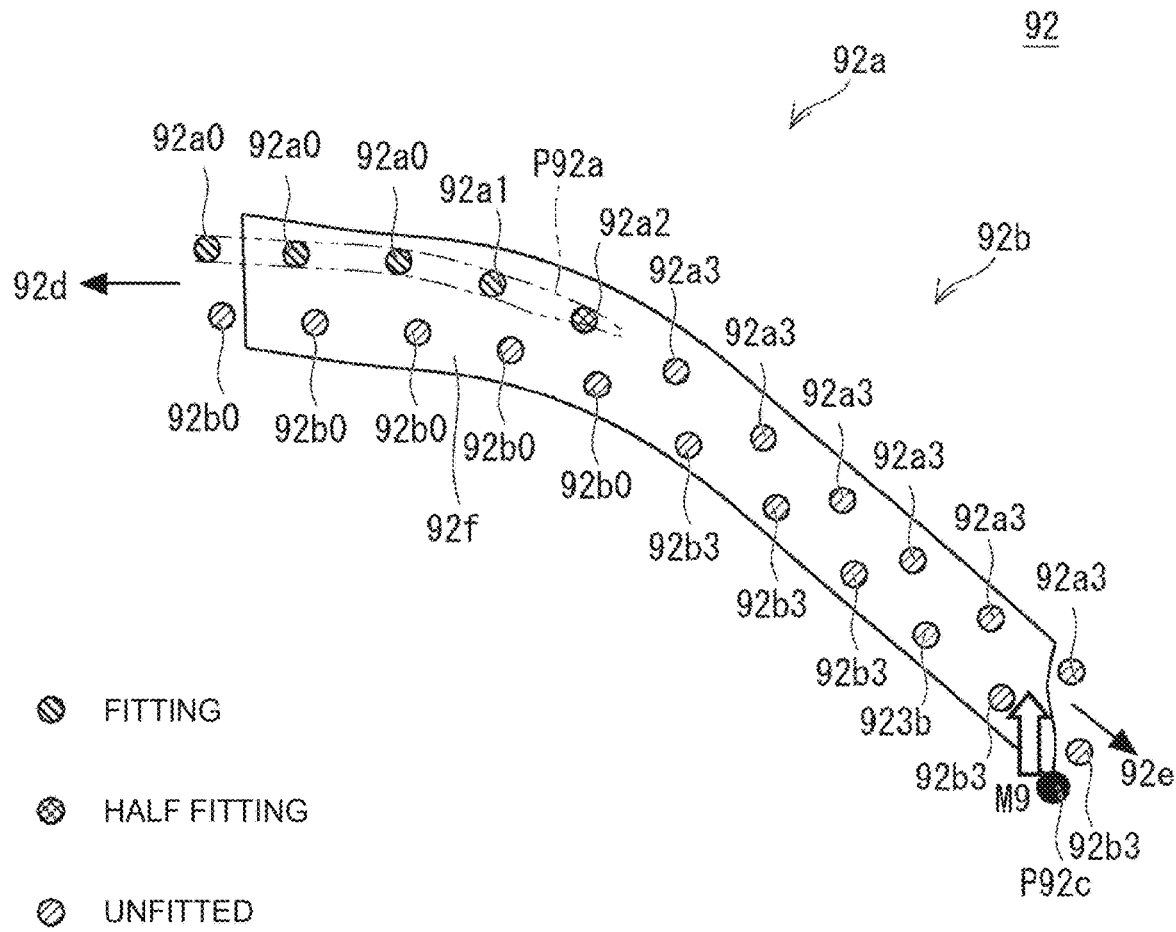

EXTENSION-RETRACTION DEVICE

CROSS-REFERENCE TO RELATED APPLICATION

This application claims priority to Japanese Patent Application No. 2023-005846 filed on Jan. 18, 2023, incorporated herein by reference in its entirety.

BACKGROUND

1. Technical Field

The present disclosure relates to extension-retraction devices.

2. Description of Related Art

A spiral advance and retreat actuator disclosed in Japanese Patent No. 4607772 includes a first strip member and a second strip member each configured in a strip shape. A separated state in which the first strip member and the second strip member that are accommodated in a swirling manner on a horizontal plane transitions to a cylindrical configuration state in which the first strip member and the second strip member are spirally wound to form a cylindrical structure. The cylindrical structure is formed by spirally winding these strip members around an axis at positions shifted from each other in the direction of the axis.

Prior to specific embodiments to which the present disclosure is applied, an expansion device according to technology related to the present disclosure will be described with reference to FIGS. 7A to 7D and 8. A extension-retraction device 900 shown in FIGS. 7A, 7B and 7C can extend or retract the cylindrical structure 90.

The operation of the extension-retraction device 900 to expand the cylindrical structure 90 will be described. The inner guide member 91 rotates in one direction around the central axis C9. Then, the inner guide member 91 winds up the outer belt 95 and the inner belt 92. Subsequently, the outer belt 95 is fed from the upper belt case (not shown) through the opening 94b of the cover 94 to the inner guide member 1, and the inner belt 92 is passed through the opening 94a of the cover 94 from the lower belt case (not shown). It passes through and is delivered to the inner guide member 91. The outer belt 95 and the inner belt 92 are spirally wound around the inner guide member 91 while engaging with each other. In other words, the outer belt 95 and the inner belt 92 are helically wound from the separated state in which the outer belt 95 and the inner belt 92 are accommodated in the upper belt case and the lower belt case, respectively. Transition to state. Thereby, the cylindrical structure 90 is elongated.

Also, the operation of the extension-retraction device 900 for contracting the cylindrical structure 90 will be described. The inner guide member 91 rotates in the other direction around the central axis C9. Then, the outer belt 95 and the inner belt 92 which are already engaged and wound are untied. Subsequently, the outer belt 95 passes from the inner guide member 91 through the opening 94b of the cover 94 and is drawn into the upper belt case, while the inner belt 92 passes from the inner guide member 91 through the opening 94a of the cover 94, It is delivered to the lower belt case described above. The outer belt 95 is housed in the upper belt case, and the inner belt 92 is housed in the lower belt case. In other words, the outer belt 95 and the inner belt 92 are stored in the upper belt case and the lower belt case, respectively, from the tubular configuration state in which the outer belt 95 and the inner belt 92 are spirally wound. Transition to state. Thereby, the cylindrical structure 90 contracts.

In such an extension operation or contraction operation of the extension-retraction device 900, transition is made between the above-described separated state and the above-described cylinder configuration state. As shown in FIGS. 7A and 7B, a portion of the plurality of protrusions 92a of the inner belt 92 are located inside the cover 94 and fit into the first spiral groove 91b. The first spiral groove 91b has a fitting portion in which a part of the plurality of protrusions 92a of the inner belt 92 and the first spiral groove 91b are fitted. The fitting portion includes an end portion P92a on the root side of the cylindrical structure 90 (here, in the negative direction of the Z-axis). Some of the plurality of protrusions 92a of the inner belt 92 include protrusions 92a1 that fit with the end portion P92a of the first spiral groove 91b. As shown in FIGS. 7A, 7B and 7D, some of the plurality of protrusions 92b within the cover 94 are fitted with the second spiral groove 91c. On the other hand, the remaining portions of the plurality of protrusions 92b inside the cover 94 do not fit into the second spiral groove 91c from the terminal end P92b of the second spiral groove 91c to the opening 94a of the cover 94, and are not fitted with the outer peripheral surface 91a. Oppose each other with a predetermined distance.

As shown in FIG. 7C, the first straight line L9a connects the end portion P92a of the fitting portion of the first spiral groove 91b or the projection 92a1 and the central axis C9 of the cylindrical structure 90. A second straight line L9b connects the terminal end P92b of the second spiral groove 91c and the central axis C9 of the cylindrical structure 90. On a plane (here, the XY plane) perpendicular to the central axis C9 of the cylindrical structure 90, the first straight line L9a and the second straight line L9b intersect to form an angle α9 of 180 degrees.

As shown in FIG. 8, the inner belt 92 has, in its longitudinal direction, an end portion 92d on the side of the inner guide member 91 and an end portion 92e on the side of the lower belt case. The multiple protrusions 92a include multiple protrusions 92a0, 92a1, 92a2, 92a3, 92b0, and 92b3. In FIG. 8, each protrusion 92a0, 92a1, 92a2, 92a3, 92b0, 92b3 is fitted (fitted) with the first spiral groove 91b or the second spiral groove 91c shown in FIG. 7D, may be fitted (half mated), or not fitted (non-mated). A plurality of protrusions 92a0, 92a1, 92a2 are arranged in a line from the end portion 92d of the inner belt 92 to the end portion 92e. A plurality of protrusions 92b0 are arranged in a row in parallel with a plurality of protrusions 92a0 and one protrusion 92a1. A plurality of protrusions 92a0 and 92a1 positioned from the end portion 92d to the end portion P92a of the fitting portion of the first spiral groove 91b are fitted with the first spiral groove 91b. Moreover, there is a possibility that the projection 92a2 positioned closest to the end portion P92a of the fitting portion is fitted with the first spiral groove 91b. On the other hand, the plurality of protrusions 92a3 positioned from the end portion P92a to the end portion 92e of the fitting portion of the first spiral groove 91b shown in FIGS. 7D and 8 are not fitted with the first spiral groove 91b. In other words, it faces the outer peripheral surface 91a with a predetermined gap therebetween. Moreover, the plurality of protrusions 92b0 and 92b3 positioned from the terminal end P92b of the second spiral groove 91c to the end portion 92e shown in FIGS. 7D and 8 are not fitted with the second spiral groove 91c, in other words, It faces the outer peripheral surface 91a with a predetermined gap therebetween. The number of protrusions 92b0 that are not engaged with the second spiral groove 91c shown in FIGS. 7D and 8 is proportional to the angle α9.

As described above, the plurality of protrusions 92a0 and one protrusion 92a1 are fitted with the first spiral groove 91b, while the plurality of protrusions 92b0 are not fitted with the second spiral groove 91c. Also, a plurality of protrusions 92b0 are arranged in a line parallel to each of the plurality of protrusions 92a0 and one protrusion 92a1. Here, a torsional moment M9 is generated at the point of contact P92c between the inner belt 92 and the lower belt case. Then, in the inner belt 92, stress concentrates on a region 92f in the vicinity of the plurality of protrusions 92b0 that are not engaged with the second spiral groove 91c. As described above, the inner belt 92 is twisted when transitioning between the separated state and the tube configuration state. As a result, stress concentrates on the inner belt 92.

SUMMARY

The inventors of the present application discovered the following technical issue.

In such a spiral advance and retreat actuator, when a transition is made between the separated state and the cylindrical configuration state, the strip members (belts) are sometimes twisted and stress is concentrated on the strip members.

The present disclosure has been made in view of the issue described above, and provides an extension-retraction device capable of suppressing stress concentration on the belts.

An extension-retraction device according to the present disclosure includes:

an extendable cylindrical structure; and an inner guide member disposed inside the cylindrical structure.

The cylindrical structure includes an outer belt and an inner belt disposed on an inner side of the outer belt.

The outer belt and the inner belt are each provided with a plurality of protrusions and a plurality of holes provided in two rows in a longitudinal direction.

The inner guide member includes a first spiral groove extending along protrusions provided in one of the two rows on a distal end side of the cylindrical structure, and a second spiral groove extending along protrusions provided on the other of the two rows on a base side of the cylindrical structure.

When the inner guide member rotates in one direction, the outer belt and the inner belt are sent out to be spirally wound while engaging with each other, and the cylindrical structure extends.

When the inner guide member rotates in another direction, the outer belt and the inner belt that have been engaged with each other and wound are drawn in to be unwound, and the cylindrical structure retracts.

The first spiral groove includes a fitting portion in which one or more of the protrusions of the inner belt are fitted in the first spiral groove.

A first straight line connects an end portion of the fitting portion and a central axis of the cylindrical structure.

A second straight line connects a terminal end of the second spiral groove and the central axis of the cylindrical structure.

On a plane orthogonal to the central axis of the cylindrical structure, an angle made by intersecting the second straight line and the first straight line is less than 180 degrees.

Further, in the extension-retraction device described above, the terminal end of the second spiral groove may be at the same position as the end portion of the fitting portion on an outer circumference of the inner guide member.

Moreover, the extension-retraction device described above may further include a cover that covers the inner guide member.

The cover may be disposed inside the cylindrical structure.

The cover may include an opening through which the inner belt passes.

An end portion of the fitting portion and the terminal end of the second spiral groove may be provided at a position adjacent to the opening of the cover on the outer circumference of the inner guide member.

According to the present disclosure, it is possible to suppress stress concentration on the belts.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a diagram showing the relationship between the projection of the inner belt and the spiral groove of the inner guide member according to the technology related to the present disclosure.

DETAILED DESCRIPTION OF EMBODIMENTS

Hereinafter, specific embodiments to which the present disclosure is applied will be described in detail with reference to the drawings. However, the present disclosure is not limited to the following embodiments. Further, in order to clarify the explanation, the following description and drawings are simplified as appropriate.

First Embodiment

An extension-retraction device according to a first embodiment will be described with reference to FIGS. 1, 2, 3A to 3D, 4A and 4B.

Figure 1:
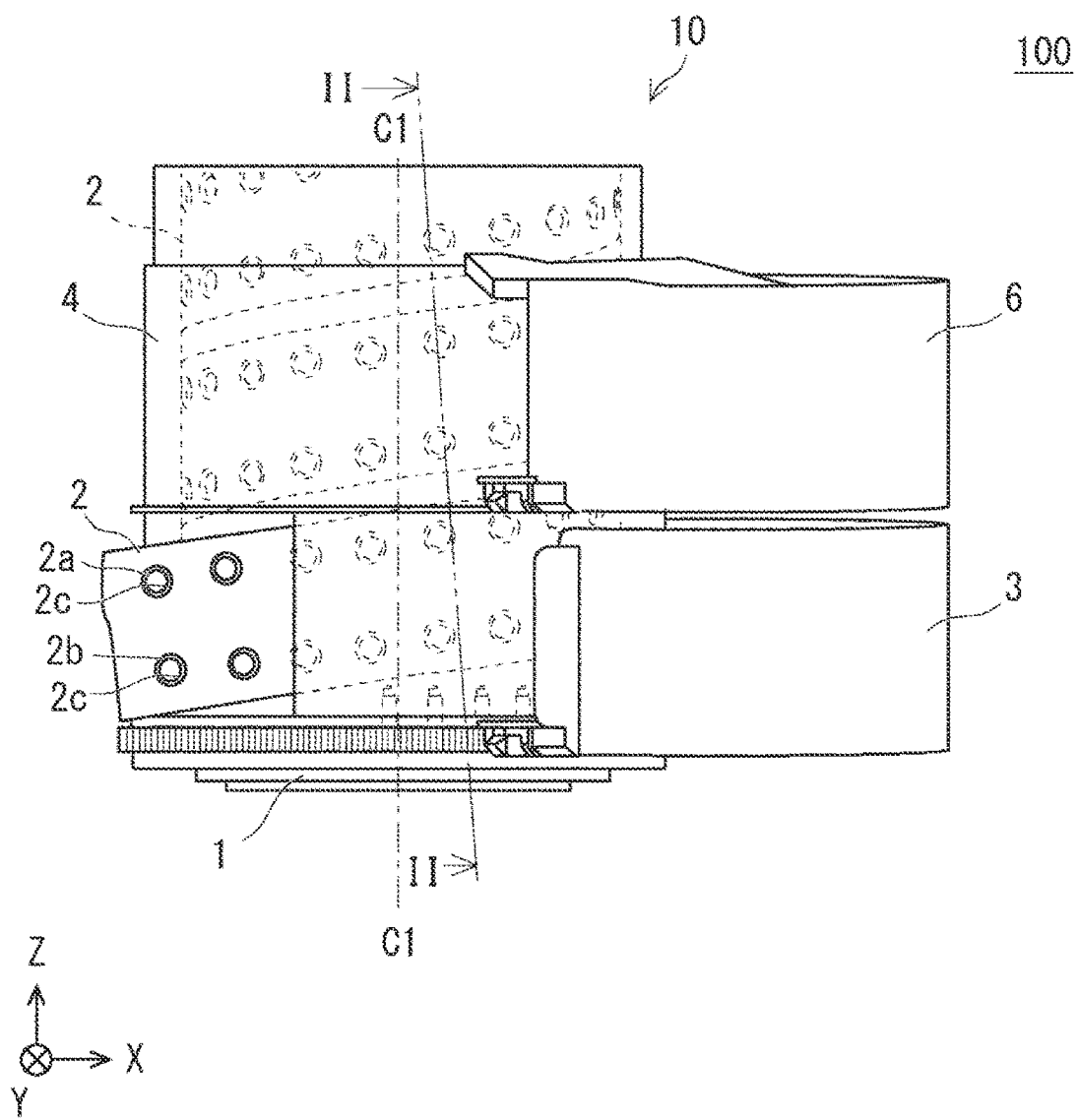
FIG. 1 is a schematic diagram showing a side surface of an expansion device according to a first embodiment.
Figure 2:
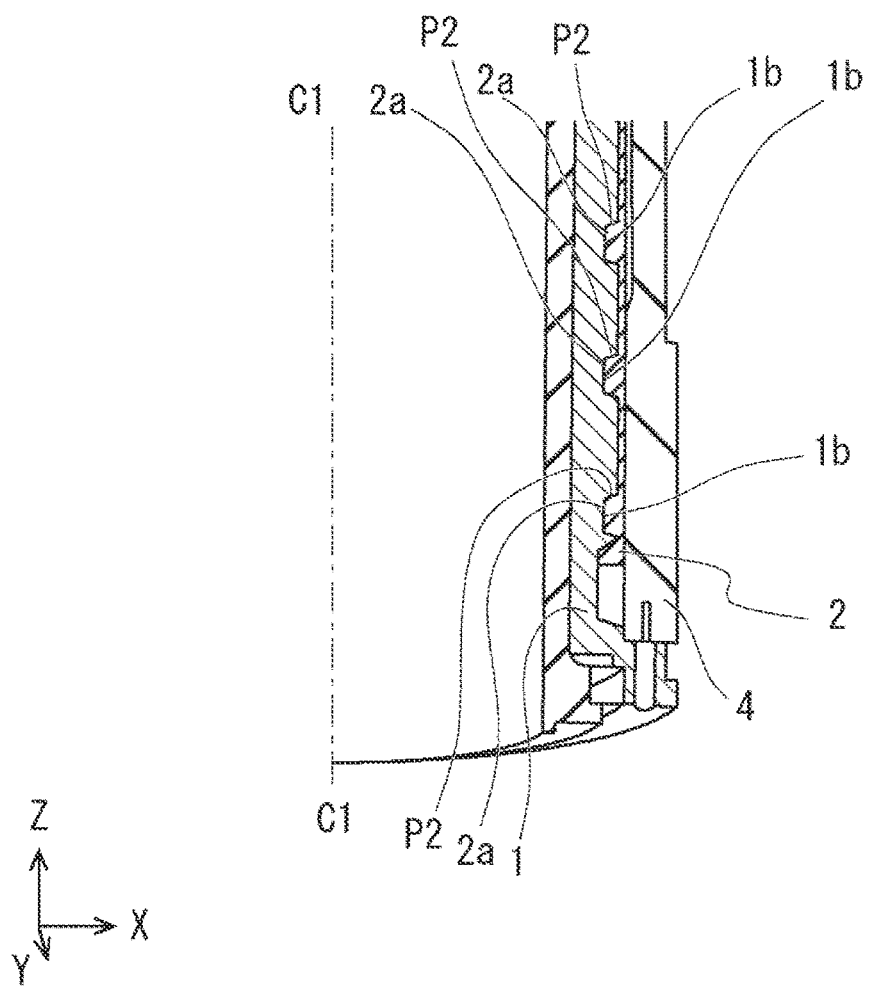
FIG. 2 is a cross-sectional view of the main part of the expansion device taken along the section line II-II.
Figure 3A:
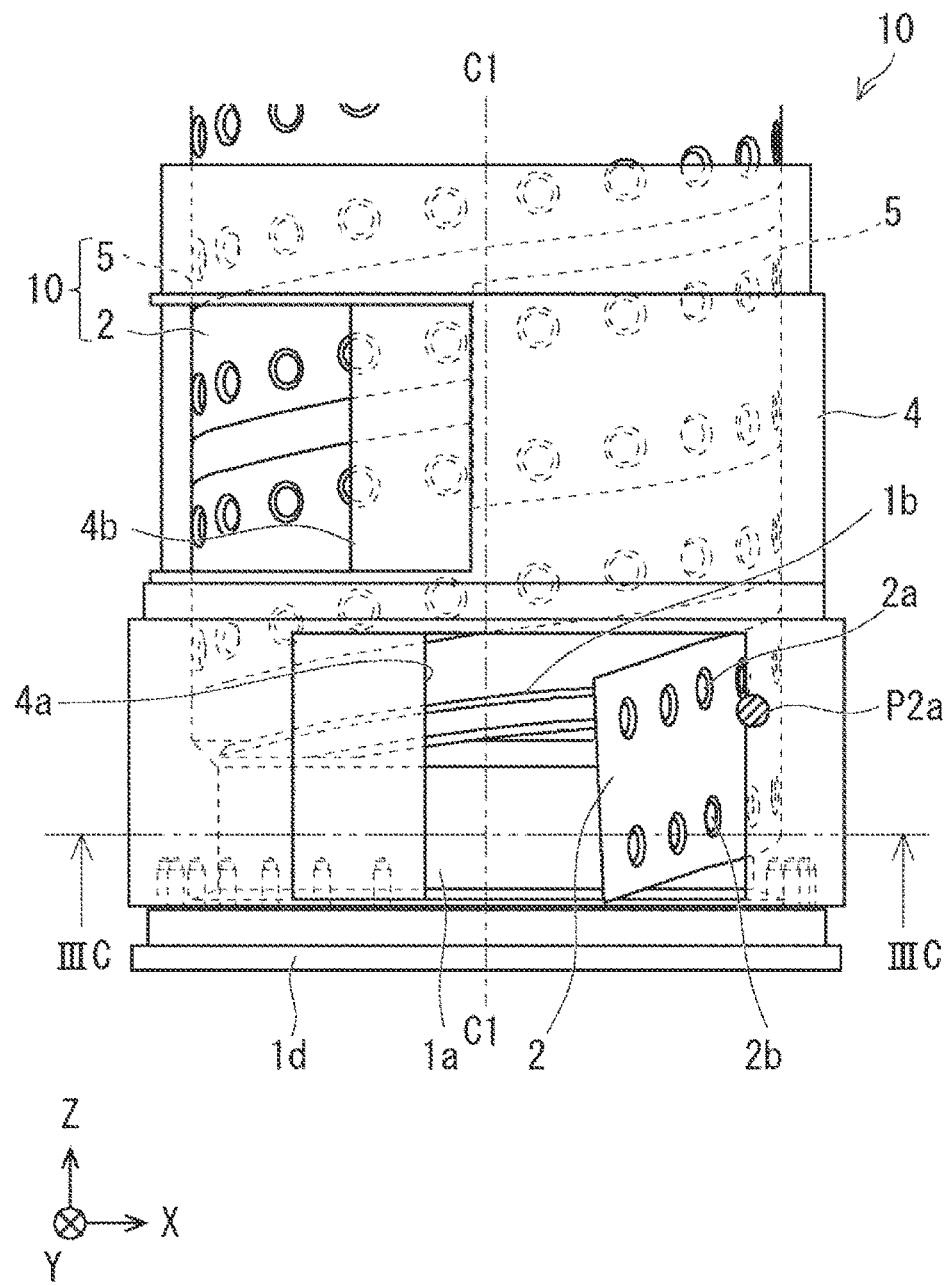
FIG. 3A is a front view of the essential parts of the expansion device according to the first embodiment.
Figure 3B:
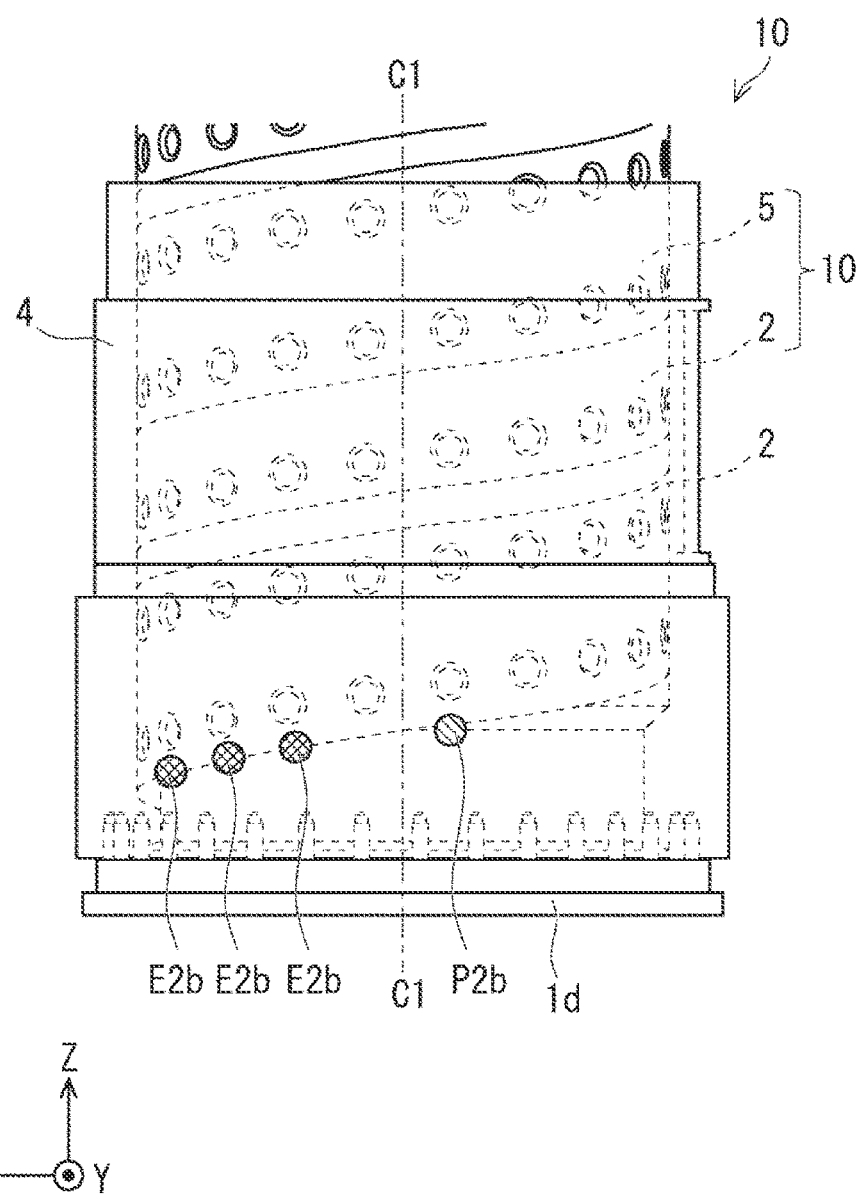
FIG. 3B is a view showing the back surface of the main part of the expansion device according to the first embodiment.

As a matter of course, the right-handed XYZ coordinates shown in FIG. 1 and other figures are shown for convenience of describing the positional relationship of the components. Usually, the Z-axis positive direction is vertically upward, and the XY plane is the horizontal plane, which are common among the drawings. The inner guide member 1 shown in FIG. 3D is obtained by rotating the inner guide member 1 shown in FIGS. 3A to 3C, FIGS. 4A and 4B around the central axis C1 at a predetermined angle around the Z axis. The inner guide member 21 shown in FIG. 5D is obtained by rotating the inner guide member 21 shown in FIGS. 5A to 5C around the central axis C1 at a predetermined angle.
Configuration As shown in FIGS. 1 and 2, the extension-retraction device 100 includes a cylindrical structure 10 and an inner guide member 1. The extension-retraction device 100 according to the first embodiment further includes a lower belt case 3, a cover 4 and an upper belt case 6.

The cylindrical structure 10 can be expanded and contracted in the central axis C1 direction (here, the Z-axis direction). As shown in FIGS. 3A and 3B, the cylindrical structure 10 includes an outer belt 5 and an inner belt 2. In the cylindrical structure 10, the inner belt 2 is arranged inside the outer belt 5. The inner belt 2 and the outer belt 5 are preferably made of flexible material. Such material is, for example, steel.

Figure 4A:
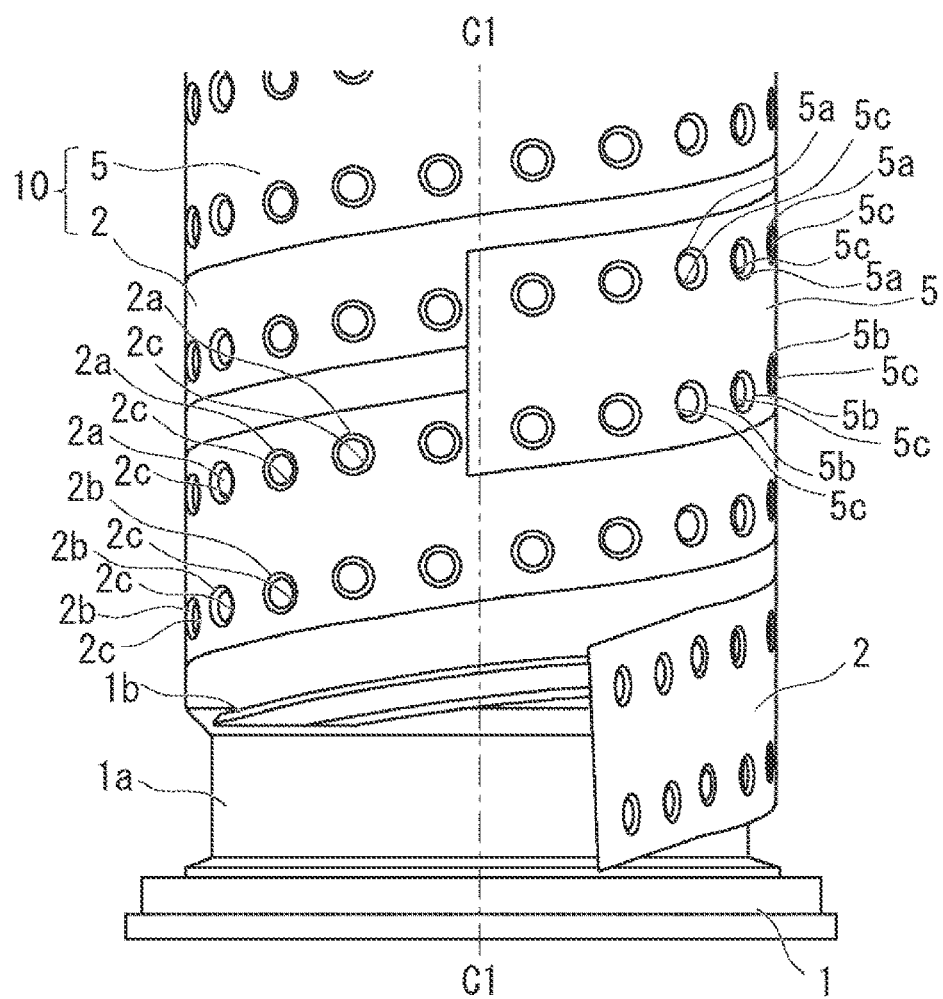
FIG. 4A is a front view of the tubular structure and the inner guide member.
Figure 4B:
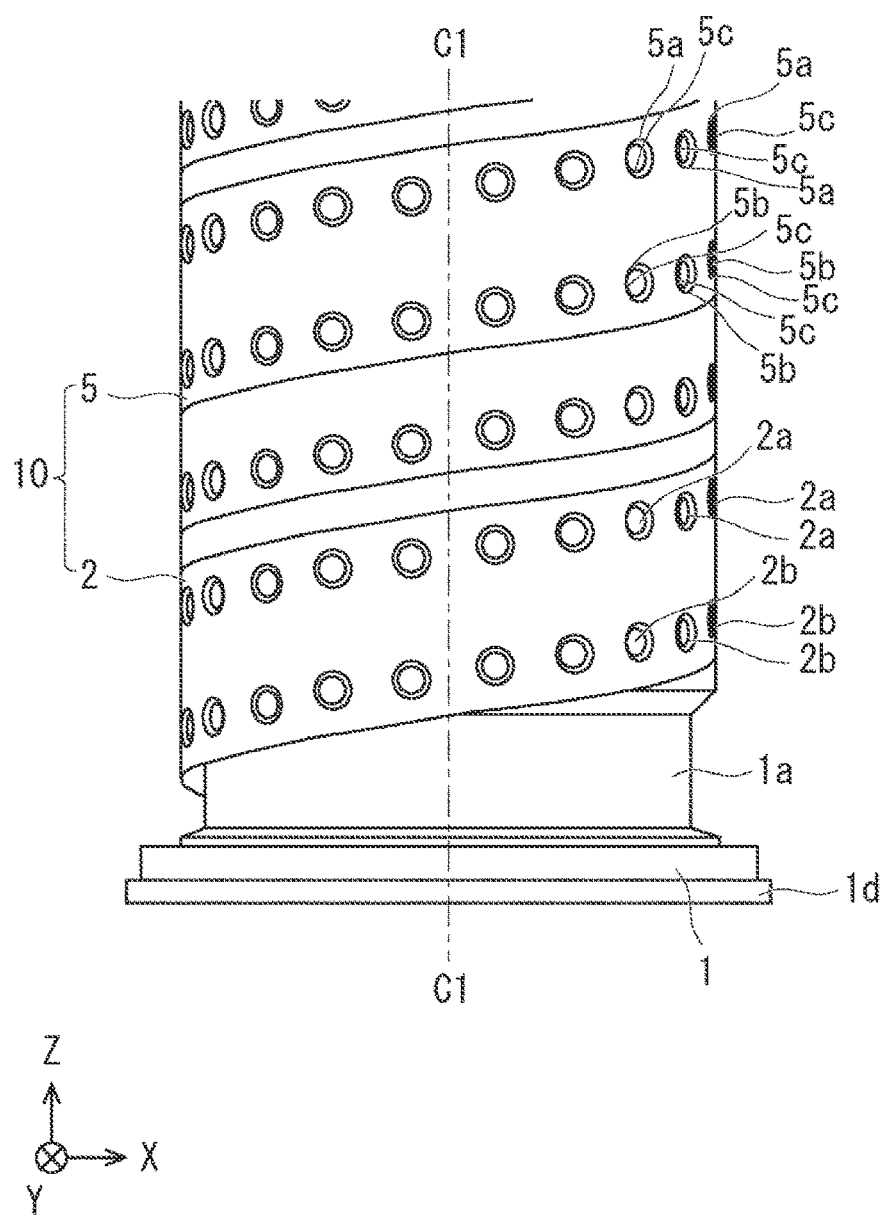
FIG. 4B is a view showing the rear surface of the tubular structure and the inner guide member.

As shown in FIGS. 4A and 4B, the outer belt 5 includes a plurality of protrusions 5a and 5b provided in two rows in the longitudinal direction of the outer belt 5 and a plurality of holes 5c. Specifically, the plurality of protrusions 5a are provided in one of two rows in the longitudinal direction of the outer belt 5. The plurality of protrusions 5b are provided in the other row of the two rows in the longitudinal direction of the outer belt 5 so as to be parallel to the plurality of protrusions 5a. The plurality of protrusions 5a are positioned above the plurality of protrusions 5b. The protrusions 5a and 5b protrude from the outer edges of the holes 5c. The protrusions 5a and 5b extend in a cylindrical shape, and the diameters of the protrusions 5a and 5b are preferably reduced from their roots to their tips. In the cylindrical structure 10, the protrusions 5a and 5b protrude toward the inner guide member 1 side.

The inner belt 2 includes a plurality of protrusions 2a and 2b provided in two rows in the longitudinal direction of the inner belt 2 and a plurality of holes 2c. Specifically, the plurality of protrusions 2a are provided in one row of the two rows in the longitudinal direction of the inner belt 2, which is located on the tip end side of the cylindrical structure 10 (here, in the positive Z-axis direction). The plurality of protrusions 2b are provided in one row of the two rows on the root side of the cylindrical structure 10 (here, in the Z-axis negative direction) in the longitudinal direction of the inner belt 2 so as to be parallel to the plurality of protrusions 2a. The plurality of protrusions 2a are positioned above the plurality of protrusions 2b. The protrusions 2a and the protrusions 2b protrude from the outer edges of the holes 2c. The protrusions 2a and 2b are elongated in a cylindrical shape, and the diameters of the protrusions 2a and 2b are preferably reduced from their roots to their tips. In the cylindrical structure 10, the protrusions 2a and 2b protrude toward the inner guide member 1 side.

In the cylindrical structure 10, the inner belt 2 and the outer belt 5 are engaged with each other. Specifically, when the inner belt 2 and the outer belt 5 are wound around the inner guide member 1, the plurality of protrusions 5a and the plurality of protrusions 5b are inserted into the corresponding plurality of holes 2c, respectively. The inner belt 2 and the outer belt 5 are engaged with each other.

The inner guide member 1 is a tubular body arranged inside the cylindrical structure 10. As shown in FIG. 3D, the outer peripheral surface 1a of the inner guide member 1 is formed with a first spiral groove 1b, a second spiral groove 1c, and a flange 1d. The first spiral groove 1b and the second spiral groove 1c are provided apart from the flange 1d on the outer peripheral surface 1a. As shown in FIGS. 3A and 3B, the flange 1d is provided on the lower side of the cylindrical structure 10 (here, in the Z-axis negative direction). As shown in FIGS. 3A, 3B and 3D, the first spiral groove 1b extends along the plurality of protrusions 2a of the inner belt 2 in the cylindrical structure 10. The first spiral groove 1b can be fitted with the plurality of protrusions 2a of the inner belt 2. The second spiral groove 1c extends along the plurality of protrusions 2b of the inner belt 2 in the cylindrical structure 10. The second spiral groove 1c can be fitted with the plurality of protrusions 2b of the inner belt 2. The first spiral groove 1b and the second spiral groove 1c extend in parallel on the outer peripheral surface 1a. The second spiral groove 1c extends toward the flange 1d or the flange 91d from the second spiral groove 91c shown in FIG. 7D. Also, the first spiral groove 1b may extend toward the flange 1d or the flange 91d compared to the first spiral groove 91b shown in FIG. 7D.

The inner guide member 1 is held rotatably around the central axis C1 of the cylindrical structure 10. The central axis C1 of the cylindrical structure 10 may be the same as the central axis of the inner guide member 1. The inner guide member 1 rotates in one direction or the other around the central axis C1 of the cylindrical structure 10 by being supplied with a driving force from a driving source such as a motor.

A cover 4 covers the inner guide member 1. The cover 4 is arranged inside the cylindrical structure 10. The cover 4 is a cylindrical body, and has openings 4a and 4b that are open on the outer peripheral surface of this cylindrical body. The opening 4a is arranged in the cover 4 and the opening 4b is arranged above the opening 4a of the cover 4. The opening 4a has a size that allows the inner belt 2 to be introduced to the inner guide member 1 side, and penetrates the wall portion of the tubular body of the cover 4. The opening 4b has a size that allows the outer belt 5 to be introduced to the inner guide member 1 side, and penetrates the wall portion of the tubular body of the cover 4.

As shown in FIG. 1, the lower belt case 3 accommodates the inner belt 2 so as to be supplied. The lower belt case 3 is arranged outside the cover 4. Note that the lower belt case 3 may have a ring shape centered on the central axis C1 of the cylindrical structure 10.

The upper belt case 6 stores the outer belt 5 shown in FIGS. 3A and 3B so as to be supplied. The upper belt case 6 is arranged outside the cover 4. The upper belt case 6 is provided above the lower belt case 3. The upper belt case 6 may have a ring shape centered on the central axis C1 of the cylindrical structure 10.

Motion

FIGS. 1, 2, 3A to 3D, 4A and 4B, the operation of the extension-retraction device 100 for expanding the cylindrical structure 10 will be described. The inner guide member 1 rotates in one direction around the central axis C1. Then, the inner guide member 1 winds up the outer belt 5 and the inner belt 2. Subsequently, the outer belt 5 is fed from the upper belt case 6 through the opening 4b of the cover 4 to the inner guide member 1, and the inner belt 2 is passed from the lower belt case 3 through the opening 4a of the cover 4 to the inner side. It is delivered to the inner guide member 1. The outer belt 5 and the inner belt 2 are spirally wound around the inner guide member 1 while being engaged with each other. In other words, from the separated state in which the outer belt 5 and the inner belt 2 are housed in the upper belt case 6 and the lower belt case 3 respectively, the outer belt 5 and the inner belt 2 are spirally wound into a cylindrical configuration. Transition to state. Thereby, the cylindrical structure 10 is elongated.

Also, the operation of the extension-retraction device 100 for contracting the cylindrical structure 10 will be described. The inner guide member 1 rotates in the other direction around the central axis C1. Then, the inner guide member 1 unwinds the outer belt 5 and the inner belt 2 which have already been wound in mutual engagement. Subsequently, the outer belt 5 passes through the opening 4b of the cover 4 from the inner guide member 1 and is pulled into the upper belt case 6, and the inner belt 2 passes through the opening 4a of the cover 4 from the inner guide member 1 to the lower side. It is pulled into the belt case 3. The outer belt 5 is housed in the upper belt case 6 and the inner belt 2 is housed in the lower belt case 3. In other words, a cylindrical configuration in which the outer belt 5 and the inner belt and the inner belt are spirally wound transitions to a separated state in which the outer belt 5 and the inner belt 2 are housed in the upper belt case 6 and the lower belt case 3, respectively. Thereby, the cylindrical structure 10 contracts.

In such an extension operation or a contraction operation of the extension-retraction device 100, transition is made between the separated state and the cylinder configuration state. As shown in FIGS. 3A and 3B, some of the plurality of protrusions 2a of the inner belt 2 are located inside the cover 4 and fit into the first spiral groove 1b. As the extension-retraction device 100 expands, the number of protrusions 2a of the inner belt 2 fitted into the first spiral groove 1b increases. Also, as the extension-retraction device 100 contracts, the number of the plurality of protrusions 2a of the inner belt 2 fitted into the first spiral groove 1b decreases. As shown in FIG. 2, the first spiral groove 1b has a fitting portion P2 where a part of the plurality of protrusions 2a of the inner belt 2 and the first spiral groove 1b are fitted. The fitting portion P2 includes an end portion P2a on the root side (here, in the negative direction of the Z-axis) of the cylindrical structure 10 shown in FIG. 3. As shown in FIGS. 3A, 3B and 3D, some of the plurality of protrusions 2b located within the cover 4 are fitted with the second spiral groove 1c. The second spiral groove 1c has a fitting portion where a part of the plurality of protrusions 2b of the inner belt 2 and the second spiral groove 1c are fitted. The fitting portion has an end portion on the root side (here, in the Z-axis negative direction) of the cylindrical structure 10, and this end portion is the terminal end P2b of the second spiral groove 1c. On the other hand, as shown in FIGS. 3A to 3D, the rest of the plurality of protrusions 2b located inside the cover 4 is not mated with the second spiral groove 1c from the terminal end P2b of the second spiral groove 1c to the opening 4a of the cover 4. For example, a plurality of protrusions 2b of the inner belt 2 provided between the second spiral groove 1c and the flange 1d are positioned at the portion E2b shown in FIG. 3B. A plurality of protrusions 2b positioned at the portion E2b are not fitted in the second spiral groove 1c and face the outer peripheral surface 1a with a predetermined gap.

Figure 3C:
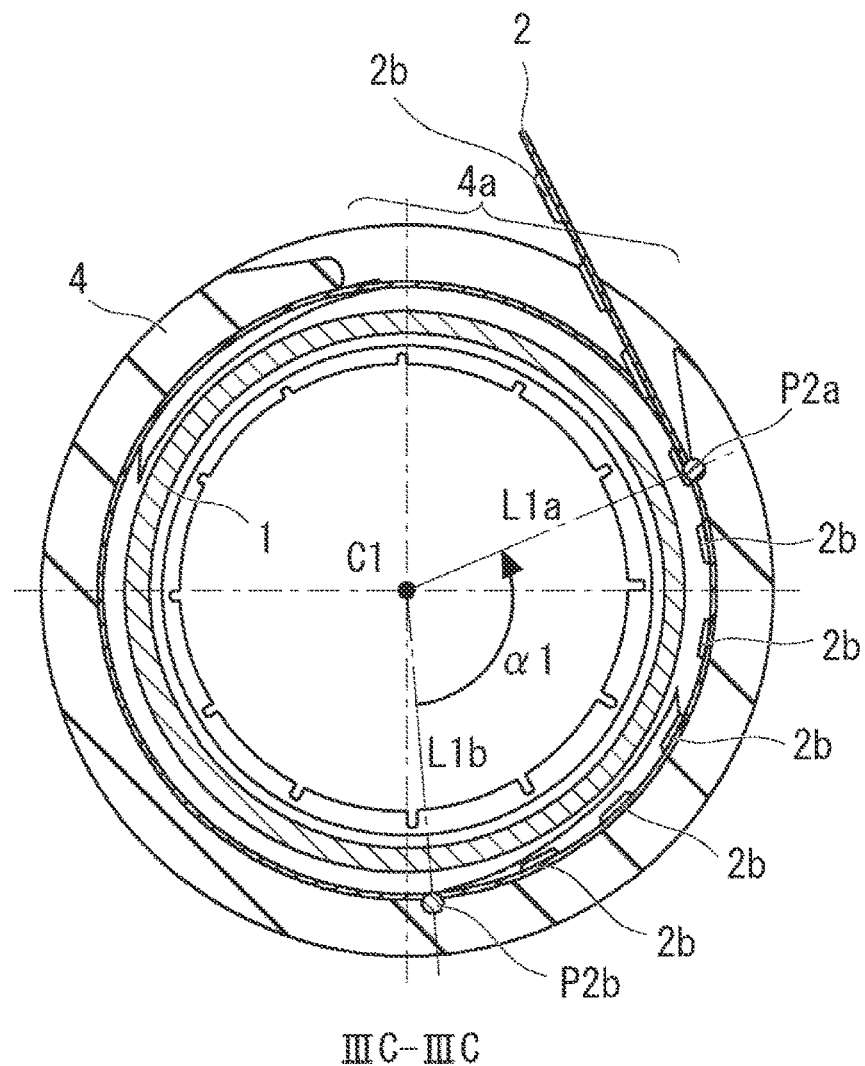
FIG. 3C is a cross-sectional view of the main part of the expansion device at section line IIIC-IIIC.
Figure 3C:
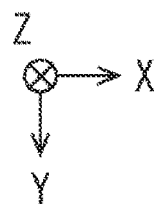
Figure 3D:
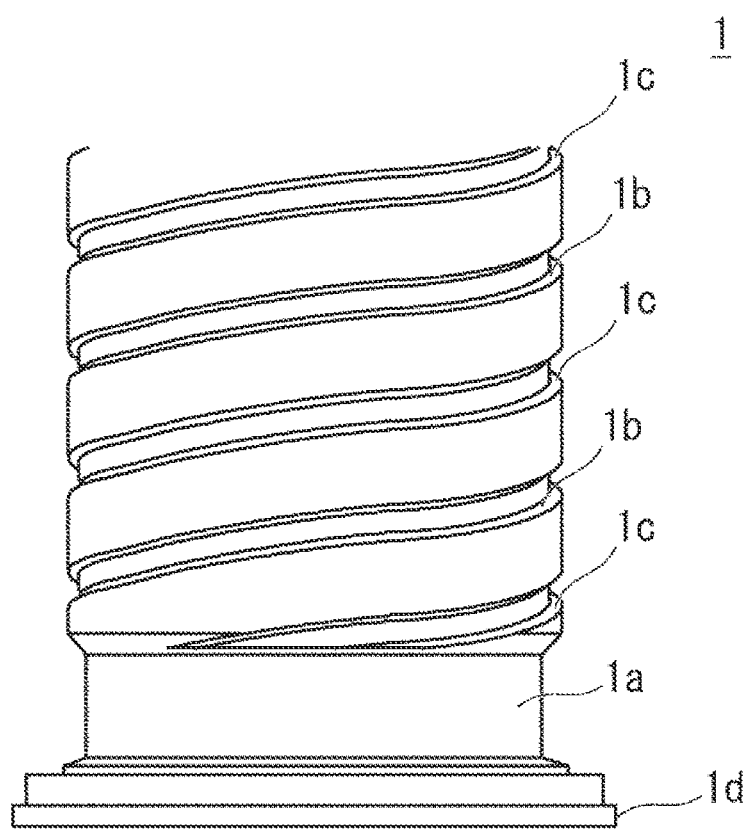
FIG. 3D is a side view of the inner guide member according to the first embodiment.

As shown in FIG. 3C, the first straight line L1a connects the end portion P2a of the fitting portion P2 of the first spiral groove 1b and the central axis C1 of the cylindrical structure 10. A second straight line L1b connects the terminal end P2b of the second spiral groove 1c and the central axis C1 of the cylindrical structure 10. On a plane perpendicular to the central axis C1 of the cylindrical structure 10 (here, the XY plane), the angle α1 formed by the intersection of the first straight line L1a and the second straight line L1b is 0 (zero) degrees or more. Less than 180 degrees. The angle α1 is the same as the rotation angle obtained by rotating the second straight line L1b around the central axis C1 of the cylindrical structure 10 counterclockwise to the first straight line L1a in the paper surface of FIG. 3C. This counterclockwise direction is substantially the same as the direction in which the inner belt 2 is drawn into the lower belt case 3 from the inner guide member 1 through the opening 4a of the cover 4.

Figure 7A:
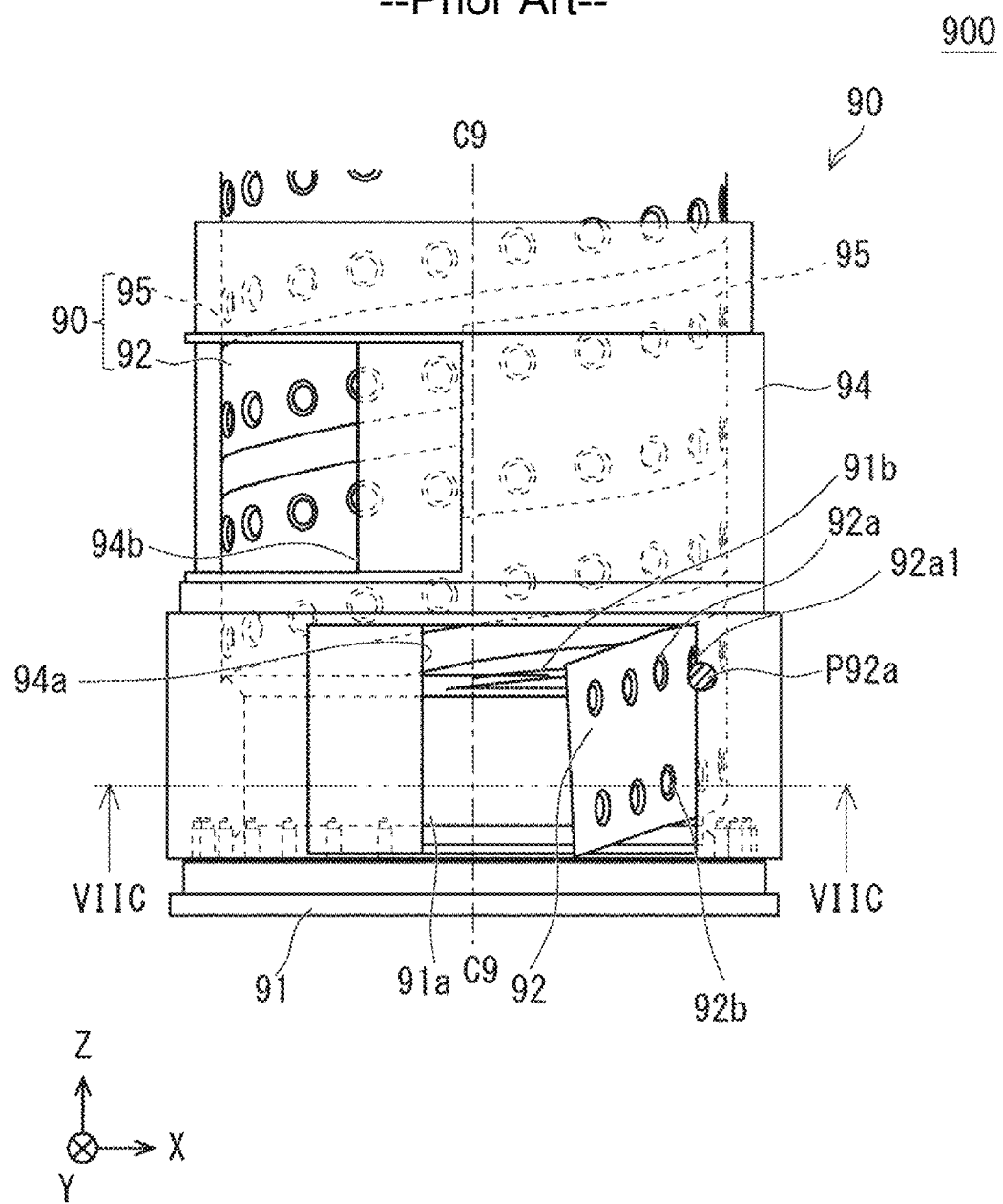
FIG. 7A is a front view of a main part of an expansion device according to technology related to the present disclosure.
Figure 7B:
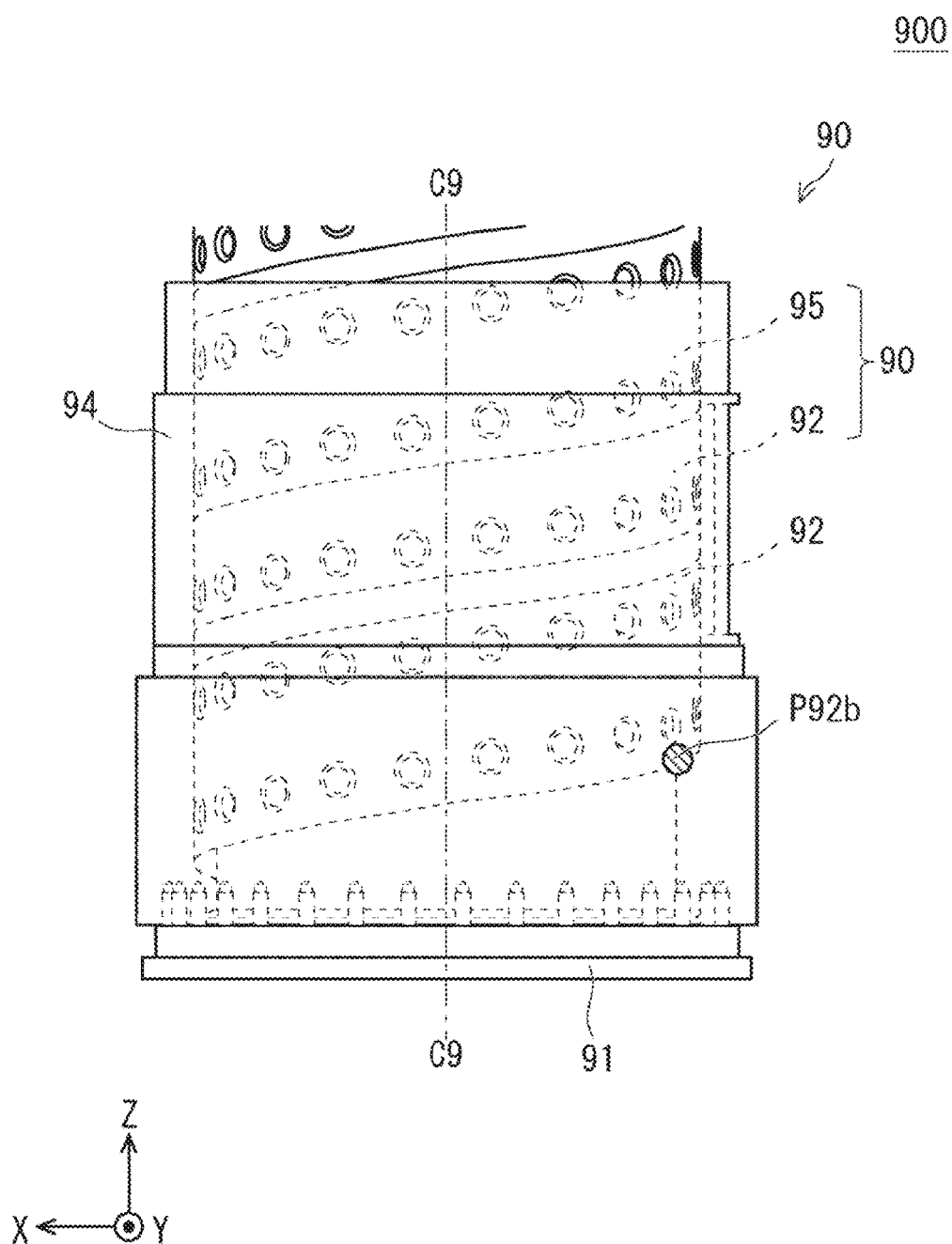
FIG. 7B is a diagram showing the back surface of the main part of the expansion device according to the technology related to the present disclosure.
Figure 7C:
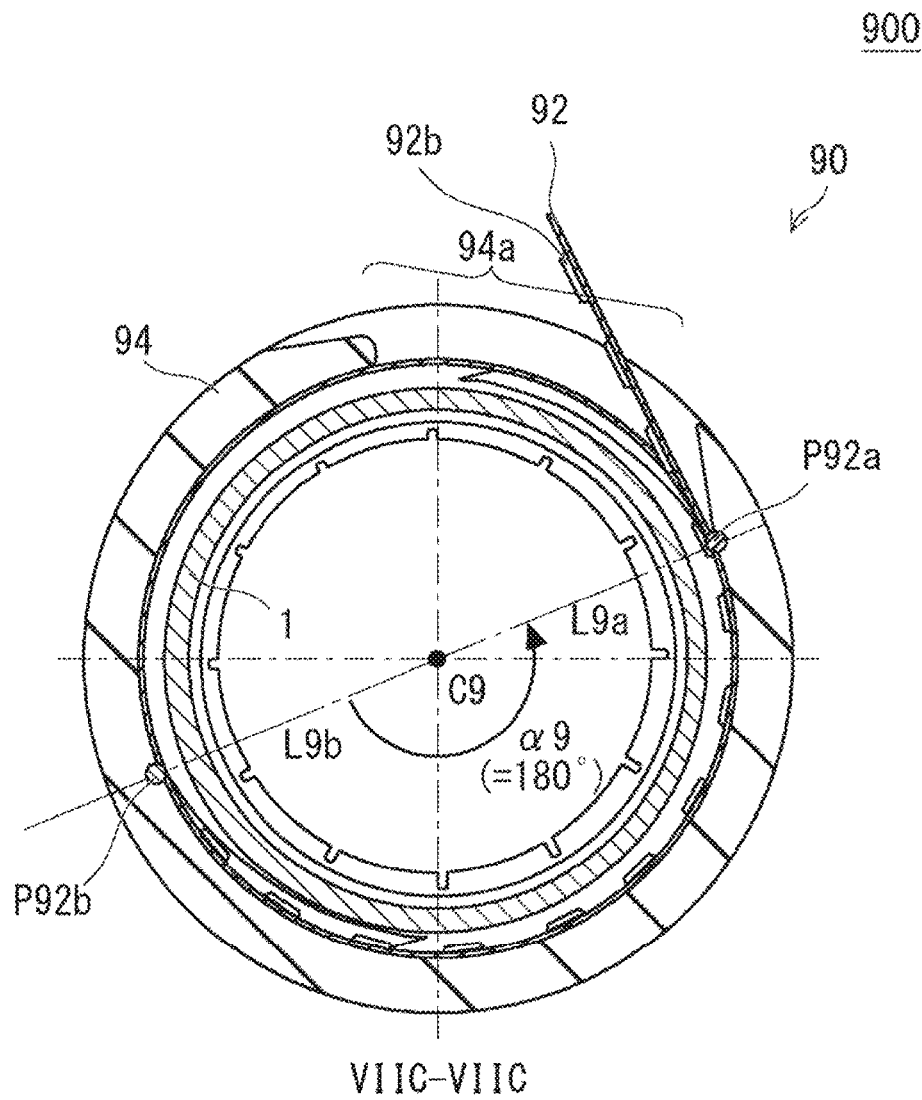
FIG. 7C is a cross-sectional view of the main part of the expansion device at section line VIIC-VIIC.
Figure 7D:
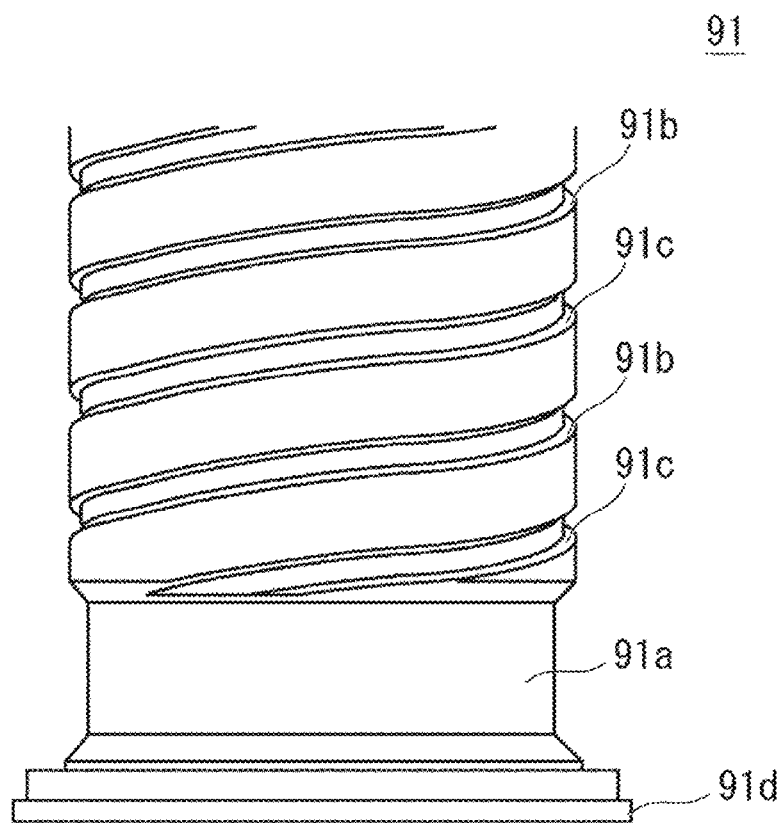
FIG. 7D is a side view of an inner guide member according to technology related to the present disclosure.

On the other hand, the angle α9 shown in FIG. 7C is 180 degrees. The angle α1 related to the extension-retraction device 100 is 0 degrees or more and less than 180 degrees, and is smaller than the angle α9. As described above, the number of protrusions 92b0 that are not engaged with the second spiral groove 91c shown in FIGS. 7D and 8 is proportional to the angle α9. Since the angle α1 is smaller than the angle α9, the number of the plurality of protrusions 2b not fitted with the second spiral groove 1c is small compared to the number of the plurality of protrusions 92b0 not fitted with the second spiral groove 91c.

Here, in such an extension operation or contraction operation of the extension-retraction device 900, transition is made between the above-described separated state and the above-described cylindrical configuration state. A torsional moment is generated at the contact point between the inner belt 2 and the lower belt case 3. The number of protrusions 2b that are not engaged with the second spiral groove 1c is smaller than the number of protrusions 92b0 that are not engaged with the second spiral groove 91c shown in FIG. 8. Therefore, the stress applied to the inner belt 2 is relatively small compared to the stress applied to the inner belt 92 in the extension-retraction device 900 shown in FIG. 7A. In the inner belt 2, the stress concentration on the region near the plurality of protrusions 2b that are not fitted with the second spiral groove 1c is suppressed. As described above, stress concentration on the inner belt 2 caused by the twisting of the inner belt 2 can be suppressed when transitioning between the separated state and the cylindrical configuration state. As a result, the life of the inner belt 2 can be extended. In addition, it is possible to prevent a part of the inner belt 2 accommodated in the lower belt case 3 from rubbing, thereby reducing noise.

Second Embodiment

Next, the extension-retraction device according to the second embodiment will be described with reference to FIGS. 5A to 5D and 6. The extension-retraction device 200 according to the second embodiment has the same configuration as the extension-retraction device 100 according to the first embodiment except for the inner guide member 21.

As shown in FIGS. 5A-5D, the extension-retraction device 200 comprises an inner guide member 21. The inner guide member 21 is a variant of the inner guide member 1 shown in FIGS. 4A and 4B. The outer peripheral surface 1a of the inner guide member 21 is formed with a first spiral groove 21b, a second spiral groove 21c, and a flange 1d. The second spiral groove 21c has the same configuration as the second spiral groove 1c except that it extends toward the flange 1d from the second spiral groove 1c shown in FIG. 3D. The first spiral groove 21b may have the same configuration as the first spiral groove 1b shown in FIG. 3D, but may extend toward the flange 1d from the first spiral groove 1b.

Figure 5A:
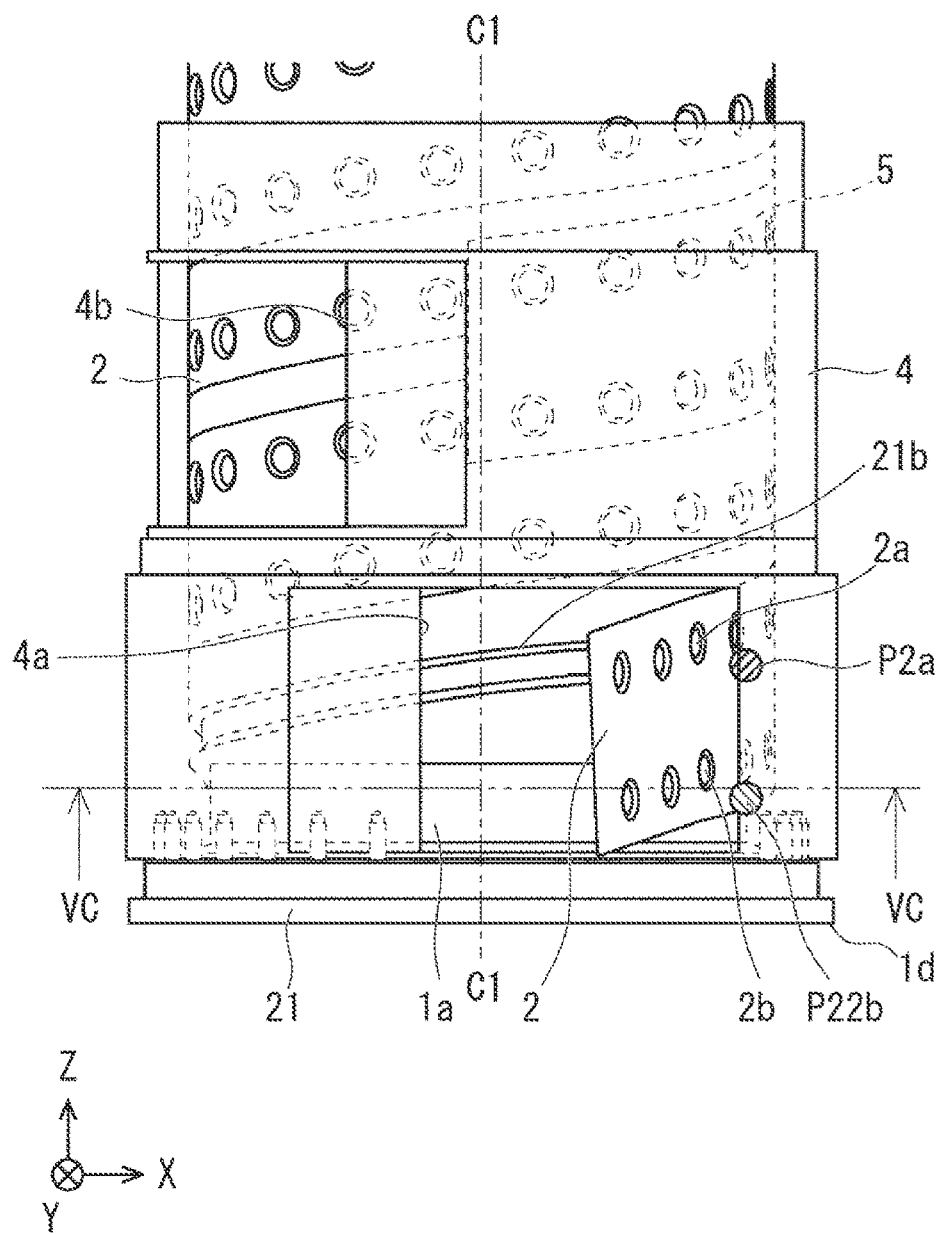
FIG. 5A is a front view of a main part of an expansion device according to a second embodiment.
Figure 5B:
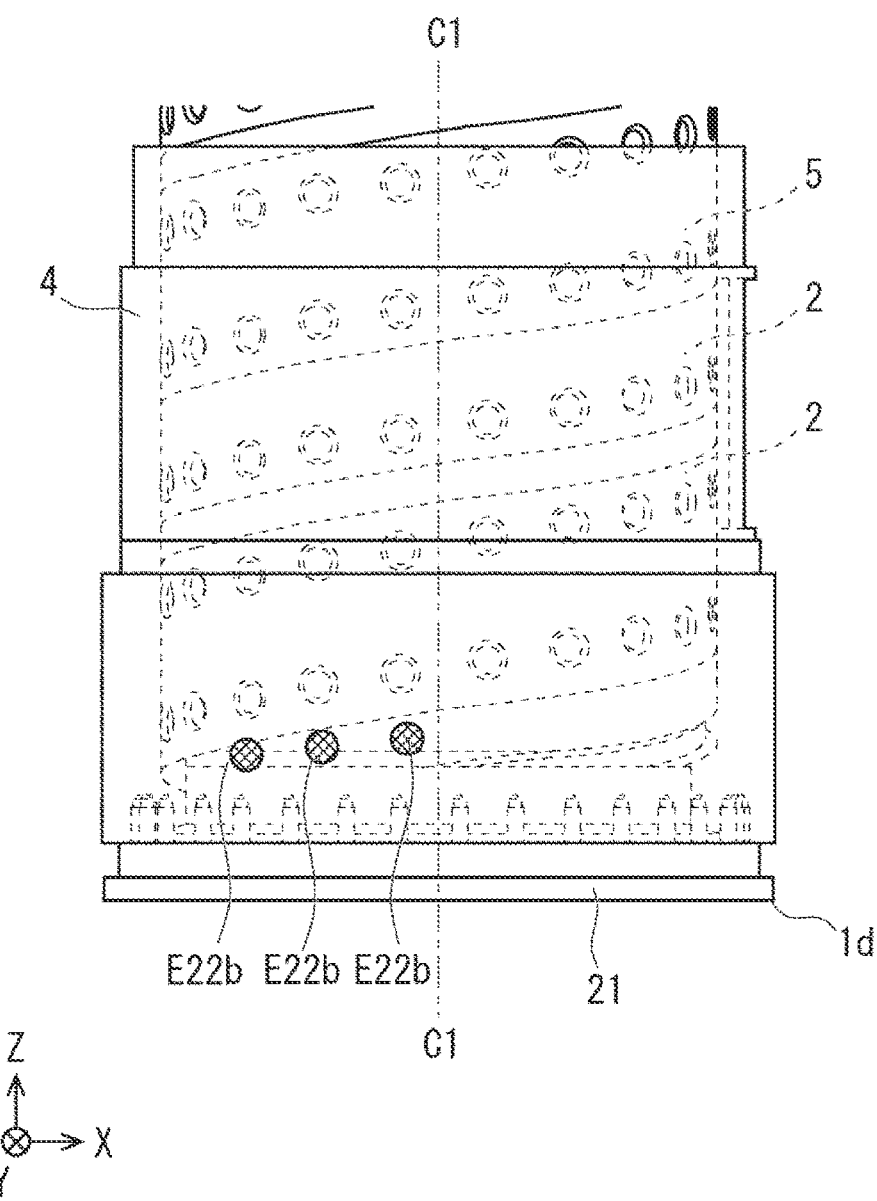
FIG. 5B is a diagram showing the back surface of the main part of the expansion device according to the second embodiment.

The extension-retraction device 200 can extend or contract the cylindrical structure 10 in the same manner as the extension-retraction device 100 shown in FIGS. 3A to 3D. Further, similarly to the extension-retraction device 100, the extension-retraction operation of the extension-retraction device 200 transitions between the separation state described above and the tubular configuration state described above. As shown in FIGS. 5A and 5B, all of the multiple protrusions 2a of the inner belt 2 within the cover 4 are fitted into the first spiral groove 21b. As the extension-retraction device 100 expands, the number of protrusions 2a of the inner belt 2 fitted into the first spiral groove 21b increases. Also, as the extension-retraction device 100 contracts, the number of the plurality of protrusions 2a of the inner belt 2 fitted into the first spiral groove 21b decreases. All of the plurality of protrusions 2b inside the cover 4 are fitted with the second spiral groove 21c. For example, as shown in FIG. 5B, the plurality of protrusions 2b of the inner belt 2 are provided with protrusions 2b that are engaged with the second spiral groove 21c. A part of the plurality of protrusions 2a of the inner belt 2 is positioned inside the cover 4 and fitted with the first spiral groove 21b. The first spiral groove 21b has a fitting portion in which a part of the plurality of protrusions 2a of the inner belt 2 and the first spiral groove 21b are fitted. The fitting portion includes an end portion P2a on the root side of the cylindrical structure 10 (here, in the Z-axis negative direction). As shown in FIGS. 5A, 5B and 5D, some of the plurality of protrusions 2b located within the cover 4 are fitted with the second spiral groove 21c. The second spiral groove 21c has a fitting portion where a part of the plurality of protrusions 2b of the inner belt 2 and the second spiral groove 21c are fitted. The fitting portion has a fitting end portion on the base side (here, in the Z-axis negative direction) of the cylindrical structure 10, and the fitting end portion is the terminal end P22b of the second spiral groove 1c. On the other hand, as shown in FIGS. 5A to 5D, the rest of the plurality of protrusions 2b located inside the cover 4 is not mated with the second spiral groove 21c from the terminal end P22b of the second spiral groove 1c to the opening 4a of the cover 4. For example, at a portion E22b shown in FIG. 5B, there are a plurality of protrusions 2b of the inner belt 2 positioned between the second spiral groove 21c and the flange 1d. A plurality of protrusions 2b located at the portion E22b are fitted with the second spiral groove 21c.

Figure 5C:
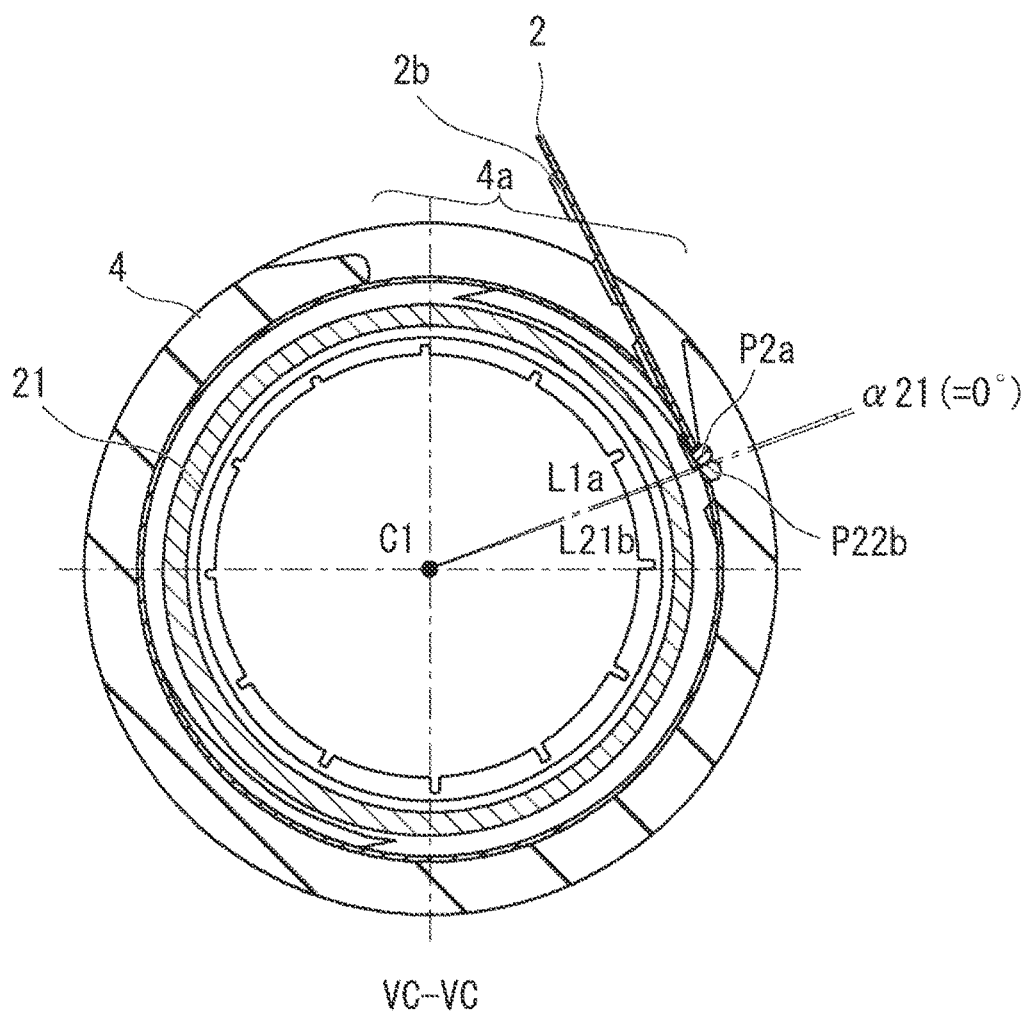
FIG. 5C is a schematic diagram of the expansion device that is viewed in the positive Z-axis direction from section VC-VC.
Figure 5D:
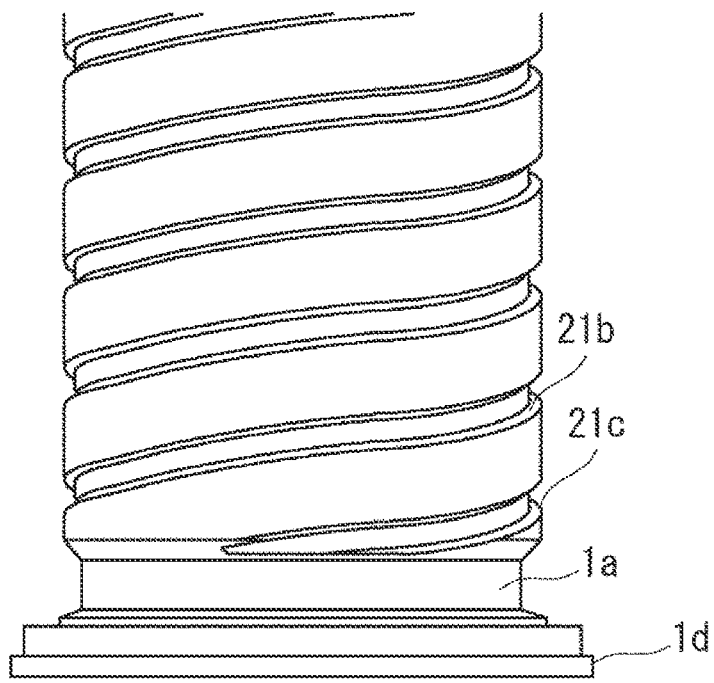
FIG. 5D is a side view of the inner guide member according to the first embodiment.

FIG. 5C shows the positional relationship between the end portion P2a and the terminal end P22b in the X-Y direction. As shown in FIG. 5C, the first straight line L1a connects the end portion P2a of the fitting portion of the first spiral groove 21b and the central axis C1 of the cylindrical structure 10. A second straight line L21b connects the terminal end P22b of the second spiral groove 21c and the central axis C1 of the cylindrical structure 10. On a plane (here, the XY plane) perpendicular to the central axis C1 of the cylindrical structure 10, the angle $\alpha 21$ formed by the intersection of the first straight line L1a and the second straight line L21b is 0 (zero) degrees. The terminal end P22b of the second spiral groove 21c is located on the outer periphery of the inner guide member 21 at the same position as the end portion P2a of the fitting portion of the first spiral groove 21b. An end portion P2a of the fitting portion and a terminal end P22b of the second spiral groove 21c are provided on the outer circumference of the inner guide member 21 at a position adjacent to the opening 4a of the cover 4.

Figure 6:
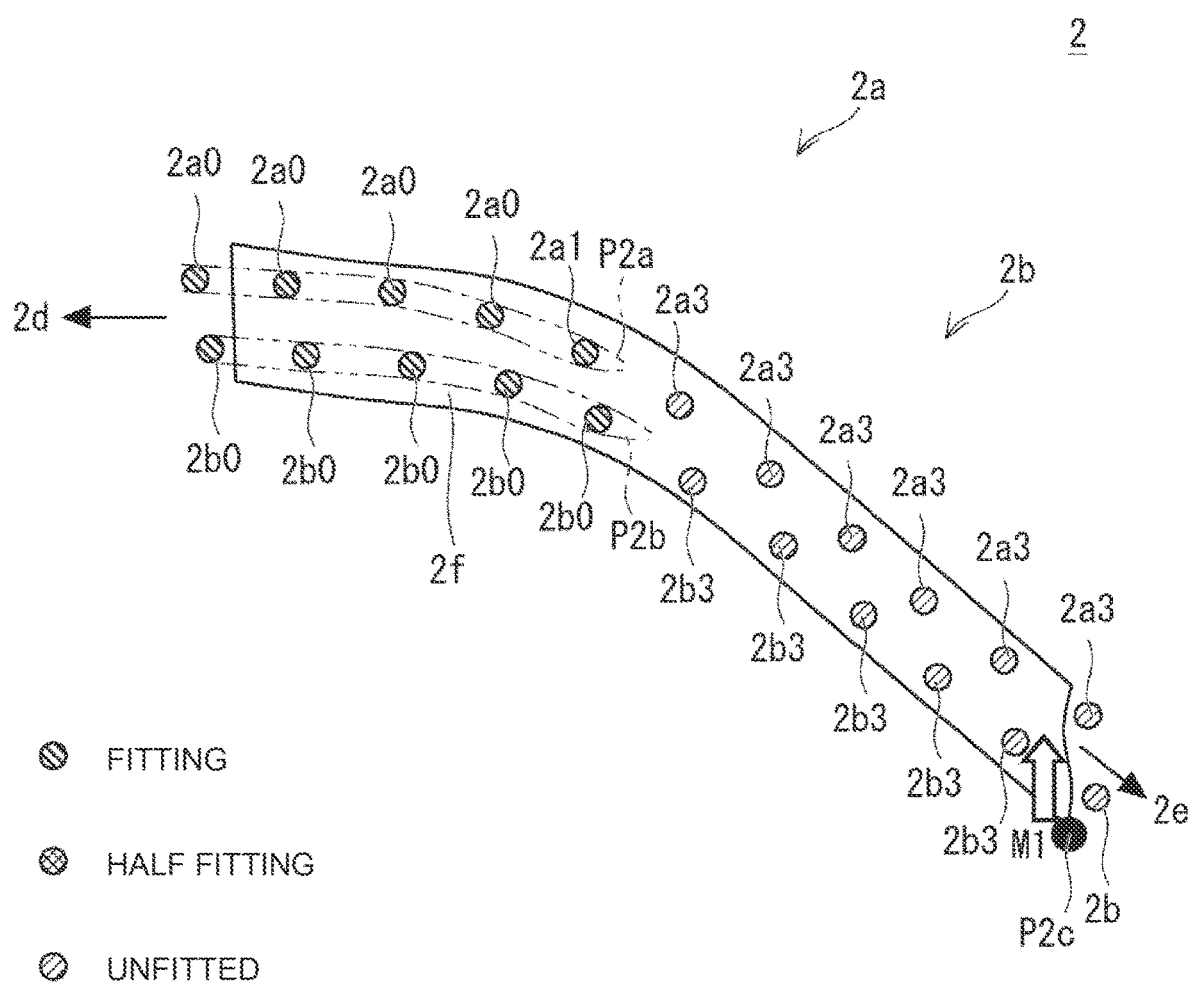
FIG. 6 is a diagram showing the relationship between the projection of the inner belt and the spiral groove of the inner guide member according to the second embodiment.

As shown in FIG. 6, the inner belt 2 has, in its longitudinal direction, an end portion 2d on the side of the inner guide member 1 and an end portion 2e on the side of the lower belt case. As shown in FIG. 6, the multiple protrusions 2a include multiple protrusions 2a0, 2a1, 2a3, 2b0, and 2b3. In FIG. 6, each projection 2a0, 2a1, 2a3, 2b0, 2b3 is fitted (fitted) or possibly fitted (half mated) or not mated (non-mated) in the first spiral groove 21b or the second spiral groove 21c. A plurality of protrusions 2a0 and 2a1 are arranged in a line from the end portion 2d of the inner belt 2 to the end portion 2e. A plurality of protrusions 2b0 are arranged in parallel with a plurality of protrusions 2a0 and one protrusion 92a1. A plurality of protrusions 2a0 provided from the end portion 2d to the end portion P2a of the fitting portion of the first spiral groove 21b are fitted with the first spiral groove 21b. Further, the projection 2a1 provided closest to the end portion P2a of the fitting portion fits into the first spiral groove 21b. On the other hand, the plurality of protrusions 2a3 provided from the end portion P2a to the end portion 2e of the fitting portion of the first spiral groove 21b shown in FIGS. 5D and 6 are not fitted with the first spiral groove 21b. In other words, it faces the outer peripheral surface 1a with a predetermined gap therebetween. A plurality of protrusions 2b0 provided from the terminal end P2b of the second spiral groove 21c to the end portion 2e shown in FIGS. 5D and 6 are fitted with the second spiral groove 21c. The plurality of protrusions 2b3 are not fitted to the second spiral groove 21c, in other words, face the outer peripheral surface 1a with a predetermined gap.

As shown in FIG. 6, a plurality of protrusions 2a0 and one protrusion 2a1 are fitted with the first spiral groove 21b, and the plurality of protrusions 2b0 are also fitted with the second spiral groove 21c. Also, a plurality of protrusions 2b0 are arranged in a row in parallel with a plurality of protrusions 2a0 and one protrusion 2a1. Here, a torsional moment M1 is generated at the contact point P2c between the inner belt 2 and the lower belt case 3. Then, in the inner belt 2, since the plurality of protrusions 2b0 are fitted in the second spiral groove 21c, the region 2f near the plurality of protrusions 2b0 is hardly twisted. As a result, little stress is concentrated in the region 2f. As described above, according to the configuration of the extension-retraction device 200 described above, stress concentration on the inner belt 2 due to twisting of the inner belt 2 can be suppressed when transitioning between the above-described separated state and the above-described cylindrical configuration state.

On the other hand, the angle $\alpha 1$ shown in FIG. 3C is 0 degrees or more and less than 180 degrees. The angle $\alpha 21$ associated with the extension-retraction device 200 is 0 degrees, which is smaller than the angle $\alpha 1$. Therefore, the number of protrusions 2b0 that do not fit into the second spiral groove 21c is smaller than the number of protrusions 2b0 that do not fit into the second spiral groove 1c. Therefore, stress concentration on the inner belt 2 due to twisting of the inner belt 2 can be further suppressed.

The present disclosure is not limited to the above embodiments, and can be appropriately modified without departing from the spirit. Further, the present disclosure may be carried out by appropriately combining the above embodiments and examples thereof.

What is claimed is:

1. An extension-retraction device comprising:

an extendable and retractable cylindrical structure; and an inner guide member disposed inside the cylindrical structure, wherein:

the cylindrical structure includes an outer belt and an inner belt disposed on an inner side of the outer belt;

the outer belt is provided with a plurality of outer belt protrusions and a plurality of outer belt holes, each outer belt protrusions of the plurality of the outer belt protrusions corresponding to an outer belt hole of the plurality of the outer belt holes, the plurality of the outer belt protrusion and respective outer belt holes being provided in two rows in a longitudinal direction of the outer belt;

the inner belt is provided with a plurality of inner belt protrusions and a plurality of inner belt holes, each inner belt protrusions of the plurality of the inner belt protrusions corresponding to an inner belt hole of the plurality of the inner belt holes, the plurality of the inner belt protrusion and respective inner belt holes being provided in two rows in a longitudinal direction of the inner belt;

the inner guide member includes a first spiral groove extending along the inner belt protrusions provided in a first row of the two rows, and a second spiral groove extending along the inner belt protrusions provided on a second row of the two rows, the first row being different from the second row;

when the inner guide member rotates counterclockwise around a central axis of the cylindrical structure, the outer belt and the inner belt are sent out to be spirally wound while engaging with each other, and the cylindrical structure extends;

when the inner guide member rotates clockwise around the central axis, the outer belt and the inner belt that have been engaged and wound are drawn in to be unwound, and the cylindrical structure retracts;

the first spiral groove includes a fitting portion in which one or more of the protrusions of the inner belt are fitted in the first spiral groove;

when the cylindrical structure is viewed, in a direction in which the central axis is aligned vertically and the inner belt wound spirally around the inner guide member appears to rise to right, the first row is vertically above the adjacent second row;

a first plane is parallel to the central axis, and includes the central axis and a vertical lower end portion of the fitting portion;

a second plane is parallel to the central axis, and includes the central axis and a vertical lower terminal end of the second spiral groove; and an angle made by intersecting the first plane and the second plane is less than 180 degrees.

* * * * *